W. F. KIESEL, Jr.
CAR TRUCK.
APPLICATION FILED NOV. 17, 1910.

1,016,073.

Patented Jan. 30, 1912.

5 SHEETS—SHEET 1.

WITNESSES:
A. S. Diven
M. E. Verbeck

INVENTOR
William F. Kiesel, Jr.
BY
Eugene Diven
ATTORNEY

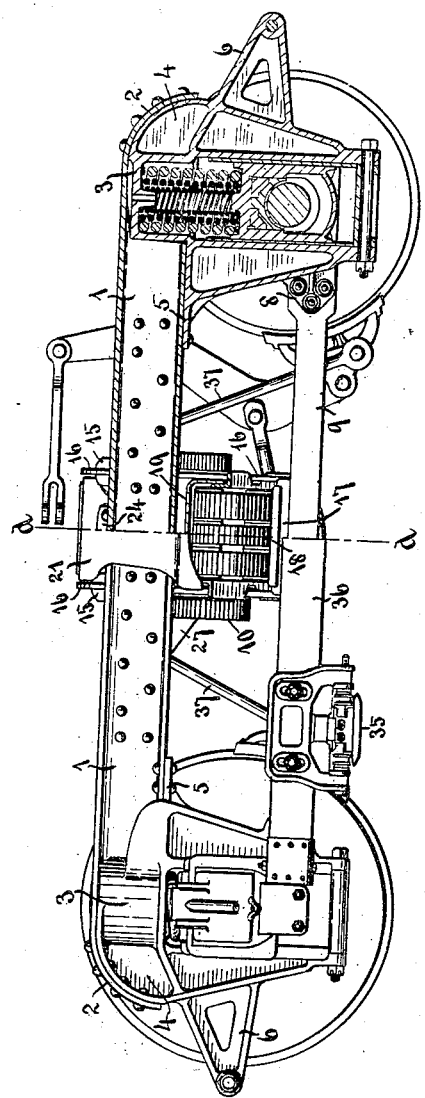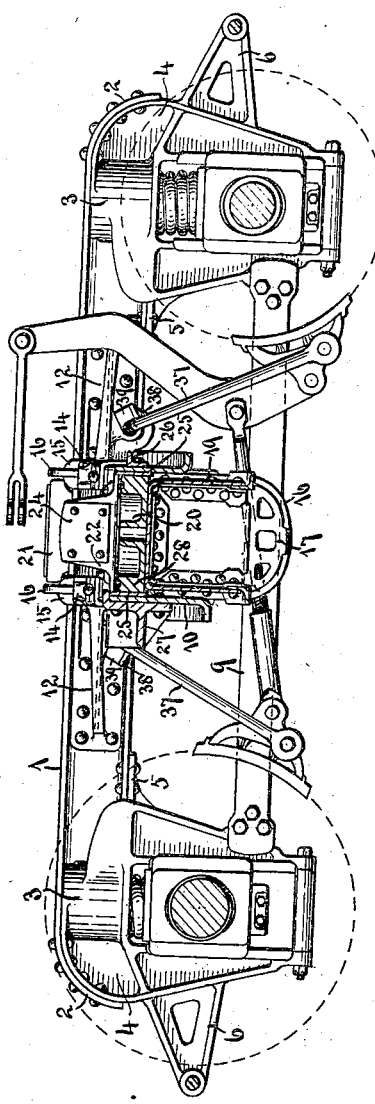

W. F. KIESEL, Jr.
CAR TRUCK.
APPLICATION FILED NOV. 17, 1910.

1,016,073.

Patented Jan. 30, 1912.

5 SHEETS—SHEET 3.

WITNESSES:
A. D. Dimen
M. E. Verbeck.

INVENTOR
William F. Kiesel, Jr.
BY
Eugene Owen
ATTORNEY

W. F. KIESEL, Jr.
CAR TRUCK.
APPLICATION FILED NOV. 17, 1910.
1,016,073.
Patented Jan. 30, 1912.
5 SHEETS—SHEET 4.
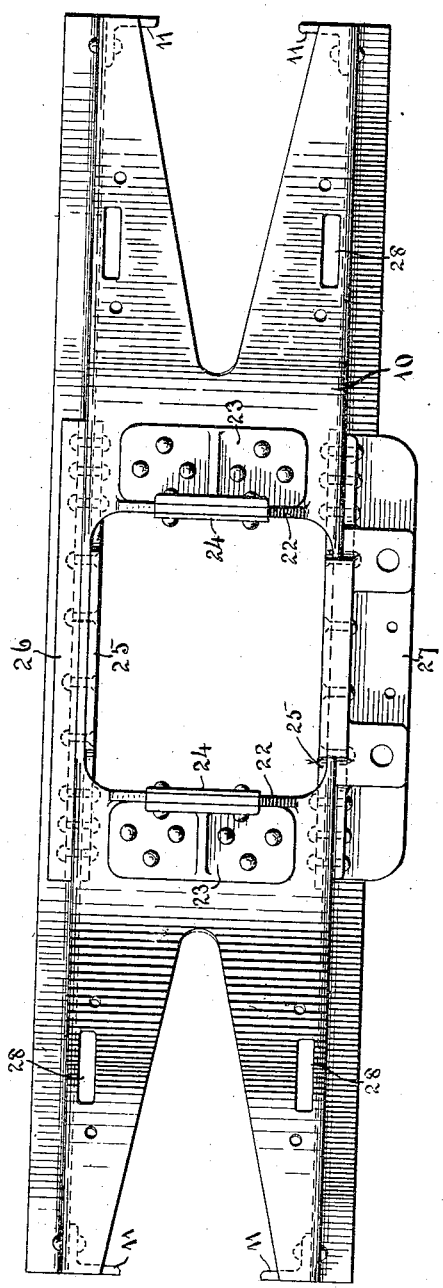
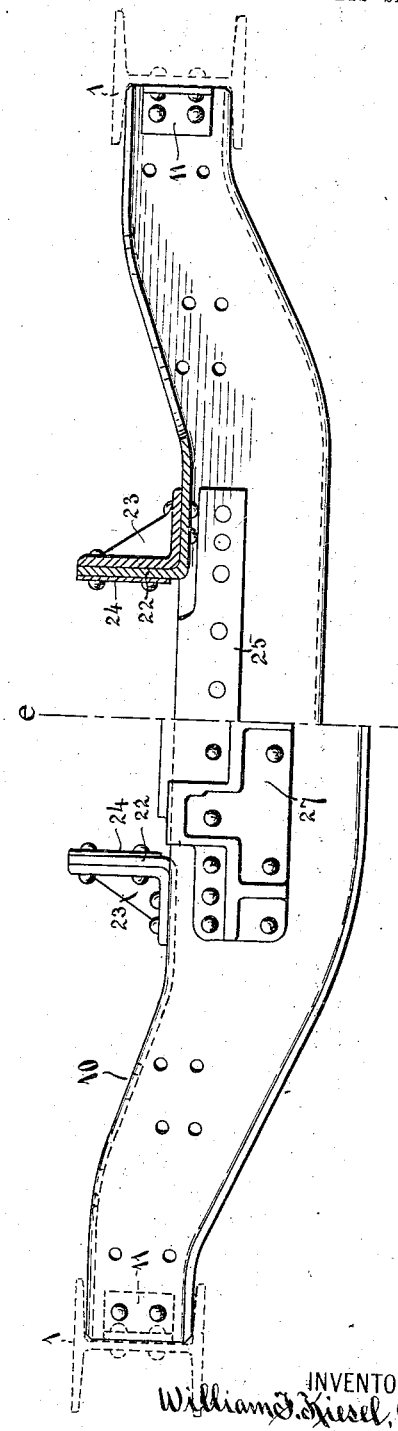
WITNESSES:
INVENTOR
William F. Kiesel, Jr.
BY
Eugene Duen
ATTORNEY W. F. KIESEL, Jr.
CAR TRUCK.
APPLICATION FILED NOV. 17, 1910.

1,016,073.

Patented Jan. 30, 1912.

5 SHEETS—SHEET 5.

WITNESSES:
O. S. Diven
M. E. Verbeck.

INVENTOR
William F. Kiesel, Jr.
BY
Eugene Diven
ATTORNEY

UNITED STATES PATENT OFFICE.

WILLIAM F. KIESEL, JR., OF ALTOONA, PENNSYLVANIA.

CAR-TRUCK.

1,016,073.

Specification of Letters Patent.

Patented Jan. 30, 1912.

Application filed November 17, 1910. Serial No. 592,830.

*To all whom it may concern:*

Be it known that I, WILLIAM F. KIESEL, Jr., a citizen of the United States, residing at Altoona, in the county of Blair and State of Pennsylvania, have invented certain new and useful Improvements in Car-Trucks, of which the following is a specification.

This invention relates to improvements in four wheel trucks for railway cars; and more particularly to motor trucks for electric railway cars: the object of my improvements being to provide a light, strong and compact truck suitable for motor car service, though not limited to such service; and to so construct the truck that it will be adapted for us with car bodies having deep center sills, where it is required to drop the center plate to near the level of the axles.

I accomplish my object by arranging and constructing the several parts of the truck in the manner illustrated in the accompanying drawings, in which—

Figure 1:
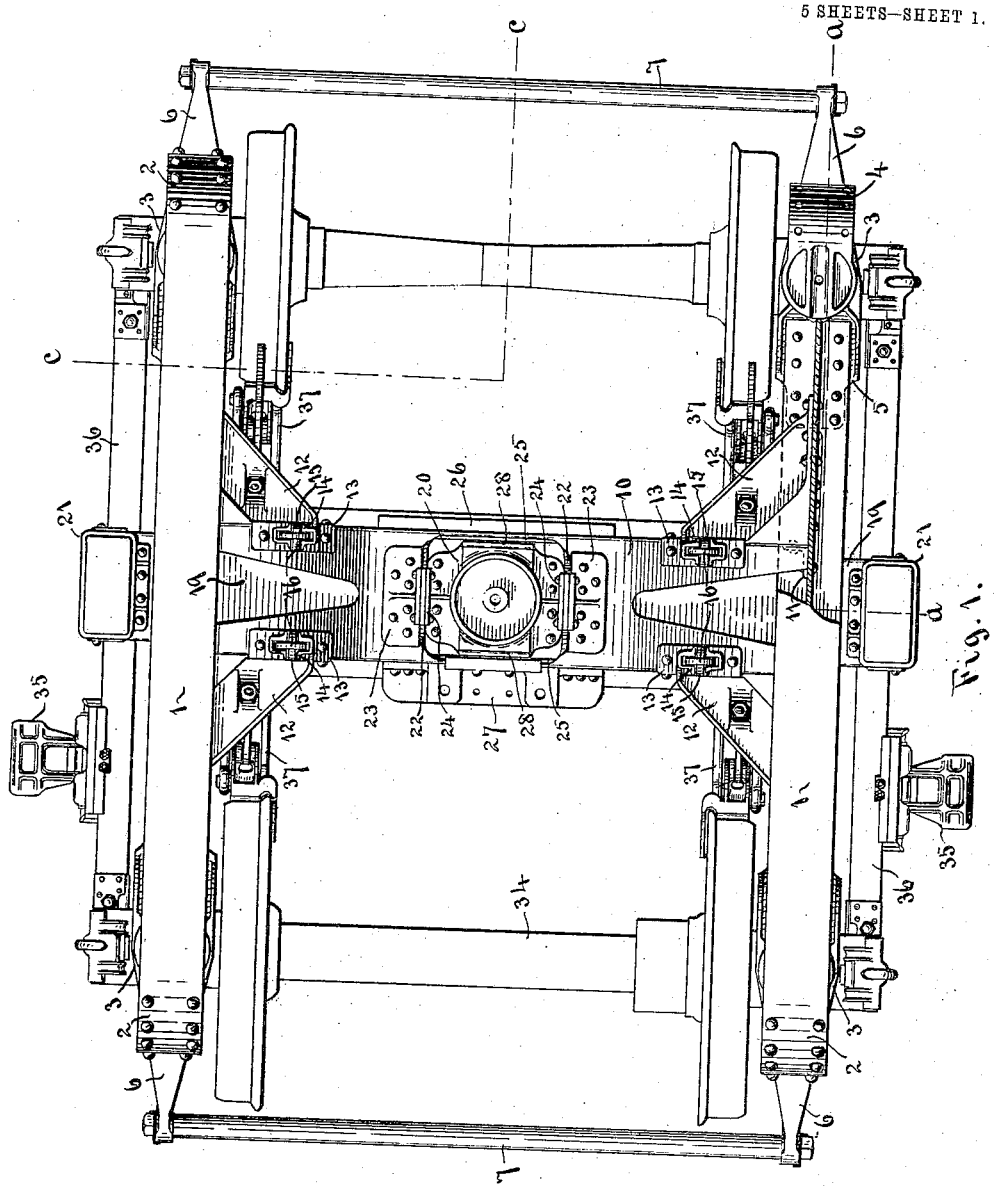
Figure 4:
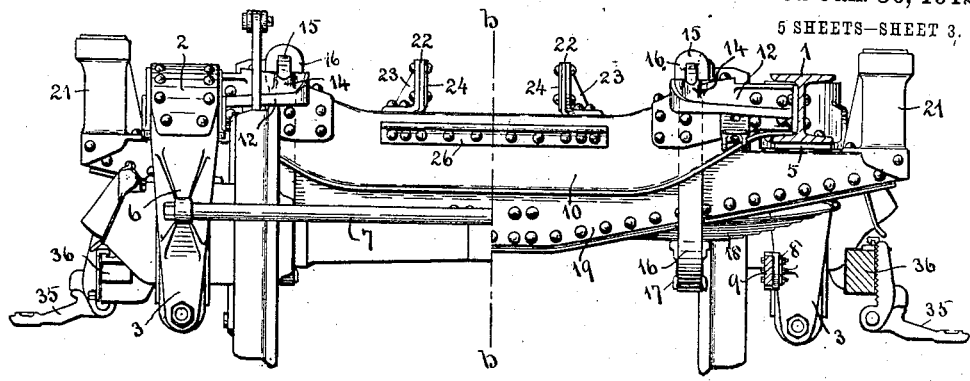
Figure 5:
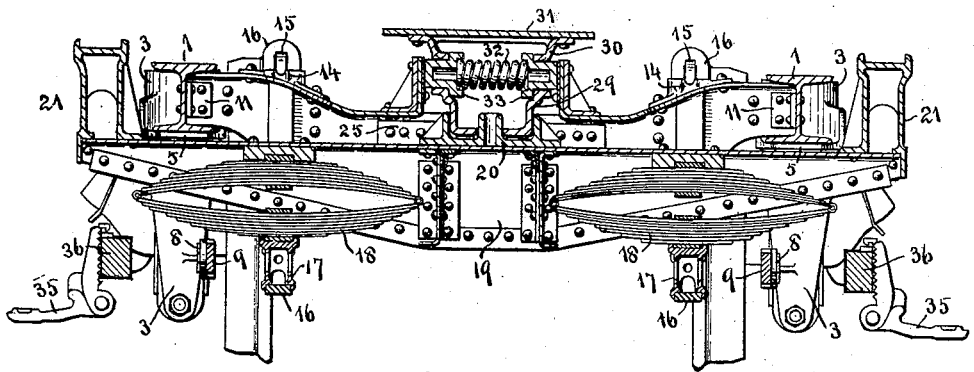
Figure 6:
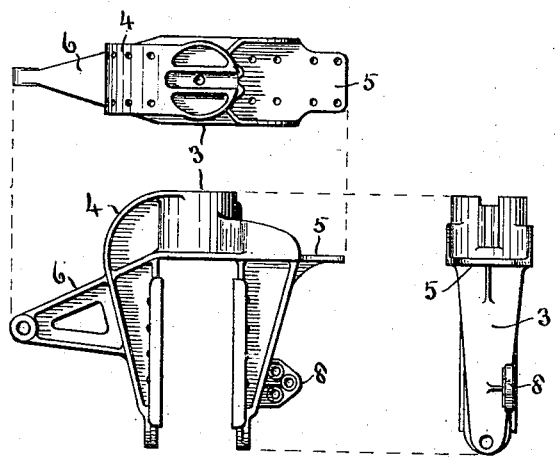
Figure 9:
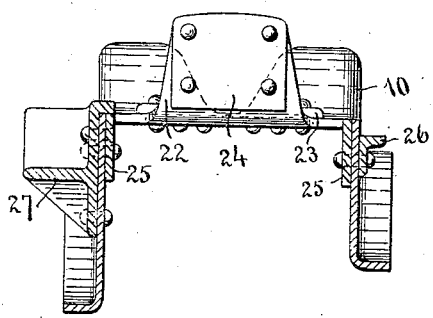
Figure 10:
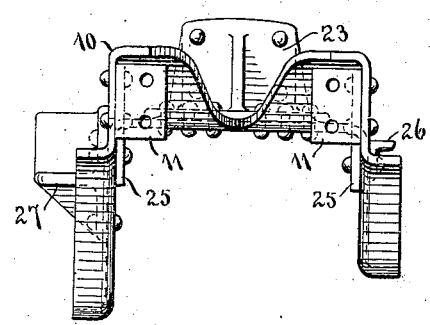
Figure 11:
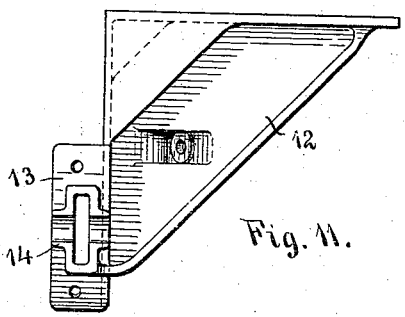
Figure 12:
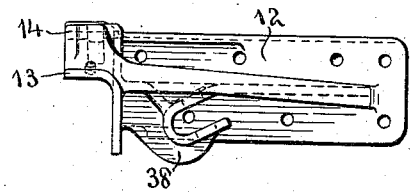
Figure 13:
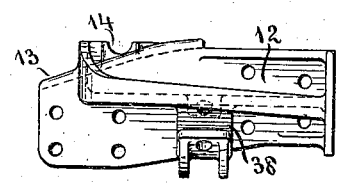
Figure 14:
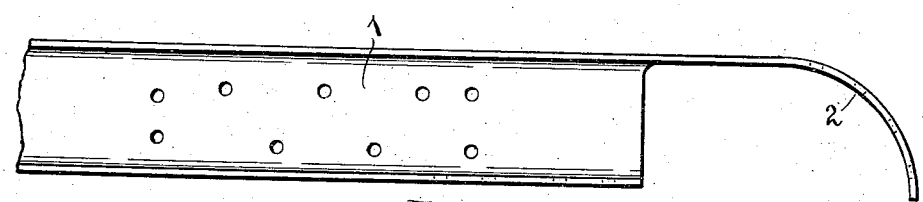
Figure 15:
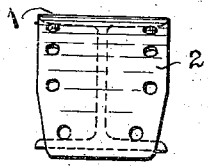

Figure 1 presents a plan view of the truck with the top portion of one of the side frames broken away; Fig. 2, a side elevation of the truck, with parts broken away for one-half the length of the truck, upon the line *a—a* in Fig. 1; Fig. 3, a central longitudinal section through the truck on the line *b—b* in Fig. 4; Fig. 4, an end elevation of the truck with parts broken away at one side on the line *c—c* in Fig. 1, and with the parts of the brake rigging omitted; Fig. 5, a transverse section of the truck on the line *d—d* in Fig. 2; Fig. 6, side, plan, and end views, respectively, of the pedestals; Fig. 7, a plan view of the transom by which the side frames are fastened together adjacent the center of the truck; Fig. 8, a side elevation of the transom, one-half being shown in section; Fig. 9, a transverse section of the transom on the line *e—e* in Fig. 8; Fig. 10, an end elevation of the transom; Fig. 11, a plan of one of the four gusset castings, by which the transom is fastened to the side frames; Fig. 12, a side view of the gusset casting, looking from below upward on Fig. 11; Fig. 13, another side view of the gusset casting, looking from right to left on Fig. 11; and Figs. 14 and 15, side and end views, respectively, of one-half of one of the H-beams for the side frames of the truck.

Like numerals designate like parts in the several views.

The side frames of the truck, each consists of an H-beam 1, to each end of which a steel pedestal casting 3 is riveted, the lower flange and the web of the H-beam being cut away, leaving the top flange projecting over the top of the pedestals. These projecting flanges 2 are bent down to conform with the curve of flanges 4 on the pedestals, and are riveted thereto, thus securely binding the H-beams and pedestals together at the top, and strengthening them against end strains. The lower flanges of the H-beams rest upon and are riveted to brackets 5 formed on the pedestal castings. At their outward ends the pedestal castings are provided with arms 6, to which the cross tie bars 7 are fastened. The inward legs of the pedestals are provided with brackets 8, to which longitudinal tie bars 9 are bolted. Adjacent the center, the side frames are united by a transom 10 of pressed steel, the cross section of which is in the form of an inverted U, this transom being more fully illustrated in Figs. 7 to 10, inclusive. The legs of the U are stiffened by outturned integral flanges, which extend from end to end of the transom. The ends of the transom are fastened to the webs of the H-beams by angle plates 11, and the transom is further fastened to the H-beams by means of four gusset castings 12. These gusset castings are provided at 13 with extensions which rest upon the top of the transom and are provided with curved bearings 14, to receive gibs 15, by which the ends of U-shaped stirrups 16 are supported upon the transom. These stirrups pass through slots in the gusset castings, and through corresponding slots 28 in the transom; and upon them rest carriers 17 for the elliptic springs 18, upon which the bolster 19 rests. The bolster is also of pressed steel, of inverted U-shaped cross section, and passes across inside the transom, with space allowance between the side walls of the two for the stirrups. Upon it rests the center plate 20 and the side bearings 21, said side bearings being fastened to the ends of the bolster where they project beyond the side frames. This bolster construction is the same as that described in my Letters Patent #800,921, dated October 3, 1905, for car trucks, and needs no further description here. The transom is depressed at the center over the center plate, and is cut out to allow the passage through it of the car body center plate. In cutting out this central opening, portions of the metal are left, said portions being bent up at each side to form vertical abutments 22, these bent up portions being braced at their outward sides by brackets 23. On the inward faces of these abutments are wear plates 24, which act as side stops for a bolster side motion spring, which is located in or above the car body center plate casting. This body center plate casting is shown at 29 in Fig. 5, being fastened to a support 30, which, in turn, is fastened to the car body center sill; as, for instance, to the bottom plate 31, of a box girder center sill, not shown. The side motion spring 32 is mounted in a chamber formed between the body center sill and its support; and is held between longitudinally movable followers 33, which pass through guide openings, provided therefor in the center plate and support, and contact with the wear plates 24; thus providing for the return of the bolster to central position, when thrown out of center by the side motion of the car.

The sides of the transom, fore and aft, are provided with wear plates 25, which are engaged by wearing faces formed at 28 on the center plate, 20. The outward sides of the transom are stiffened to resist the fore and aft pressure of the center plate against them by an angle bar 26, riveted thereto upon the one side, and the motor nose suspension casting 27 upon the other side.

The motor will be mounted upon the driving axle 34 opposite the nose suspension casting 27; and it will be noted that the construction of the pedestals gives ample allowance above the boxes for the driving axle for adequate bearing springs; the spring chambers in the pedestal castings rising, as they do, to near the top flanges of the H-beams. The electric current is conducted to the motor by means of the contact shoes 35, carried by brackets mounted upon wooden beams 36, attached to the axle boxes.

A specially designed brake rigging is applied to this truck, and is made the subject of another application, filed of even date herewith. The inverted U-shaped hangers 37 for supporting this brake rigging are suspended from brackets 38, formed on the underside of the gusset castings 12, the hangers being held in place on these suspension brackets by means of blocks 39, fastened by bolts which pass through holes in the inclined depression in the webs of the gusset castings and the upwardly inclined lips of the brackets 38, as shown in Figs. 11 to 13.

The transom and bolster are positioned closer to the trailer axle than to the motor axle in this truck, in order to nearly equalize the strains on the journals caused by the difference in running conditions between the two axles.

This truck construction is equally well adapted for use for other than electric car service, and may be used with wheels of equal diameter; and I do not limit myself in this regard, nor do I limit myself to the specific details of construction.

What I claim as my invention and desire to secure by Letters Patent is—

1. A car truck having side frames consisting of H beams cut away at each end below the top flange, and pedestals underlying and fastened to said flange, the under flange of the beam being fastened to brackets extending thereunder from the pedestals.

2. A car truck having side frames consisting of H beams cut away at each end below the top flange and pedestals underlying and fastened to said flange, the pedestals being provided with downwardly inclined extensions to which the ends of the flange are fitted and fastened, and the under flange of the beam being fastened to brackets extending thereunder from the pedestals.

3. A car truck having side frames consisting of H beams cut away at each end below the top flange, pedestals underlying and fastened to said flange and also fastened to the under flange, the pedestals being provided with extension arms which project beyond the truck wheels at each end of the truck, and tie bars extending across the truck and fastened to said arms.

4. A car truck having side frames consisting of H beams cut away at each end below the top flange, pedestals underlying and fastened to said flange and also fastened to the under flange, cross tie bars fastened to extension arms on the pedestals at each end of the truck, and tie bars connecting the inner legs of the pedestals at the sides of the truck.

5. In a car truck, the combination, with the side frames, of a transom joining the side frames at or adjacent the center of the truck, a bolster hung beneath the transom, and a center plate on the bolster, the transom being provided with an opening over the center plate to permit the passage therethrough of a car body center plate.

6. In a car truck, the combination with the side frames, of a transom joining the side frames at or adjacent the center of the truck, a bolster hung beneath the transom, a center plate on the bolster, a car body center plate passing through an opening provided therefor in the transom into engagement with the bolster center plate, a side motion spring in a housing above the car body center plate, spring followers slidably mounted in the walls of the housing, and wear plates supported by the transom with which the followers engage.

7. In a car truck, the combination, with the side frames, of a transom joining the side frames at or adjacent the center of the truck and depressed at the center, a bolster hung beneath the transom, a center plate on the bolster, a car body center plate passing through an opening provided therefor in the transom into engagement with the bolster center plate, a side motion spring in a housing above the car body center plate, spring followers slidably mounted in the walls of the housing above the depressed portion of the transom, and wear plates carried by vertical supports rising from the transom with which the followers engage.

8. In a car truck, the combination, with the side frames, of a transom joining the side frames at or adjacent the center of the truck, corner gussets fastened to the transom and side frames, a bolster beneath the transom, stirrups upon which the bolster is supported extending upward through the transom, and gibs seated in the corner gussets upon which the stirrups are hung.

9. In a car truck, the combination, with the side frames, of a transom joining the side frames at or adjacent the center of the truck, corner gussets fastened to the transom and side frames, bolster stirrups passing upward through the transom, gibs upon which the stirrups are hung seated in bearings on the corner gussets, and brake hangers hung from depending brackets on the corner gussets.

10. In a car truck, the combination, with the side frames, of a pressed steel transom of inverted U shaped cross section, a bolster inside the transom, bolster stirrups passing upward through the transom, and pivotal supports for the stirrups on the transom.

11. In a car truck, the combination, with the side frames of a pressed steel transom of inverted U shaped cross section, a bolster inside the transom, bolster stirrups passing upward through and pivotally supported upon the transom, a center plate on the bolster having wearing faces fore and aft, and wear plates on the inside of the transom engaged thereby, the top of the transom over the center plate being cut away to permit the passage therethrough of a car body center plate.

12. In a car truck, the combination, with side frames having H beam horizontal members, of a pressed steel transom of inverted U shaped cross section fastened at its ends to the webs of the beams, and corner gussets fastened to the sides of the transom and to the webs of the beams.

13. In a car truck, the combination, with side frames having H beam horizontal members, of a pressed steel transom of inverted U shaped cross section fastened at its ends to the webs of the beams, corner gussets fastened to the sides of the transom and to the webs of the beams, and projections on the corner gussets resting upon the top of the transom and provided with gib seats for bolster stirrups, the transom and projections being correspondingly slotted to receive the ends of the stirrups.

14. A transom for car trucks of pressed steel having an inverted U shaped cross section, the top of the transom having a central opening and the sides being provided with wear plates at said opening inside the transom.

15. A transom for car trucks of pressed steel having an inverted U shaped cross section and depressed at the center, the top of the transom being cut out at the center and having vertical flanges at longitudinally opposite sides of this opening, wear plates on the flanges, and fore and aft wear plates on the inward sides of the transom at the opening.

16. A transom for car trucks of pressed steel having an inverted U shaped cross section and outwardly flanged along its bottom edges, the central portion being depressed and provided with an opening across the top, wear plates fore and aft on the inside of the transom at said opening, stiffening members on the outward sides of the transom opposite the wear plates, upturned flanges on the top of the transom at longitudinally opposite sides of the opening, brackets backing the outward sides of said flanges, and wear plates on the inward sides of the flanges.

17. A corner gusset for car truck transoms having a triangular horizontal member with riveting flanges on two sides thereof, one of said flanges being bent over the transom at the top and provided with a slotted seat for a stirrup gib.

18. A corner gusset for car truck transoms having a triangular horizontal member with riveting flanges on two sides and a supporting bracket for a brake hanger depending from the under side thereof.

19. In a car truck, the combination, with the side frames, of a pressed steel transom of inverted U shaped cross section, a pressed steel bolster of inverted U shaped cross section located inside the transom and passing out at each end beneath and beyond the side frames, side bearings at the ends of the bolster, a center plate at the center of the bolster below an opening in the top of the transom, springs inside the bolster, stirrups upon which the springs rest rising between the bolster and transom at each side thereof, and pivotal supports for the stirrups upon the transom.

In testimony whereof I have affixed my signature, in presence of two witnesses.

WILLIAM F. KIESEL, Jr.

Witnesses:
J. FOSTER MECK,
J. C. STORM.

Copies of this patent may be obtained for five cents each, by addressing the "Commissioner of Patents Washington, D. C."